(12) United States Patent
Jungen et al.

(10) Patent No.: US 8,709,609 B2
(45) Date of Patent: Apr. 29, 2014

(54) STAIN-BLOCKING AQUEOUS COATING COMPOSITION

(75) Inventors: Alice Jungen, Bergheim (DE); Jorg Rudiger Schulz, Cologne (DE); Thomas Bernhofer, Cologne (DE)

(73) Assignee: Akzo Novel Coatings International B.V., Arnhem (NL)

( * ) Notice: Subject to any disclaimer, the term of this patent is extended or adjusted under 35 U.S.C. 154(b) by 127 days.

(21) Appl. No.: 13/514,670

(22) PCT Filed: Dec. 14, 2010

(86) PCT No.: PCT/EP2010/069571
§ 371 (c)(1),
(2), (4) Date: Jun. 8, 2012

(87) PCT Pub. No.: WO2011/073164
PCT Pub. Date: Jun. 23, 2011

(65) Prior Publication Data
US 2012/0244368 A1   Sep. 27, 2012

(30) Foreign Application Priority Data

Dec. 17, 2009   (EP) .................................... 09179692

(51) Int. Cl.
*B32B 23/08* (2006.01)
*B32B 21/04* (2006.01)
*C08F 220/12* (2006.01)

(52) U.S. Cl.
USPC ........... 428/507; 428/508; 428/511; 428/514; 428/537.1; 524/562

(58) Field of Classification Search
None
See application file for complete search history.

(56) References Cited

U.S. PATENT DOCUMENTS

| | | | | |
|---|---|---|---|---|
| 4,021,398 A | * | 5/1977 | Gilman et al. | 524/437 |
| 4,432,797 A | * | 2/1984 | Vasishth et al. | 106/34 |
| 5,312,863 A | | 5/1994 | Rheenen et al. | |
| 2003/0073778 A1 | | 4/2003 | Zhang et al. | |

FOREIGN PATENT DOCUMENTS

| | | |
|---|---|---|
| EP | 1344806 | 9/2003 |
| WO | WO 2005/071023 | 8/2005 |

OTHER PUBLICATIONS

International Search Report and Written Opinion, PCT/EP2010/069571, mailed May 10, 2011.
Reply to Written Opinion of the International Searching Authority, PCT/EP2011/063359, dated Aug. 24, 2011.
International Preliminary Report on Patentability, PCT/EP2011/063359, mailed Nov. 23, 2011.

* cited by examiner

*Primary Examiner* — Sheeba Ahmed
(74) *Attorney, Agent, or Firm* — Kenyon & Kenyon LLP

(57) ABSTRACT

A stain blocking water borne coating composition is disclosed, said composition comprising (a) a styrene acrylic resin and, (b) a substituted styrene acrylate copolymer, wherein, by weight, said styrene acrylic resin is provided in excess of said substituted styrene acrylate copolymer. A method is also disclosed whereby this water-borne coating composition is applied to a substrate comprising water extractable staining agents, such as a tannin-containing open grain natural wood.

13 Claims, No Drawings

STAIN-BLOCKING AQUEOUS COATING COMPOSITION

REFERENCE TO RELATED APPLICATIONS

This application is the U.S. National Phase of PCT/EP2010/069571 filed on Dec. 14, 2010, and claims the benefit of EP Application No. 09179692.0, filed on Dec. 17, 2009.

FIELD OF THE INVENTION

This invention relates to an aqueous coating composition suitable for use as a stain-blocking coating for a wood substrate. More particularly, the present invention is directed to a coating composition which is most suitably applied to a wooden substrate as a primer or a mid-coat and which comprises a combination of a styrene acrylic resin with a substituted styrene acrylate copolymer.

BACKGROUND TO THE INVENTION

In view of the recent environmental legislation that has established limits on the amounts of volatile organic compounds (VOCs) which are allowed in different coating systems, there has been a definite shift away from solvent borne coatings to water borne systems.

Many of the substrates to which conventional solvent-borne coating compositions have been applied are characterized by containing water-soluble staining agents. These stains are effectively blocked by solvent-based coatings because the stain is not solubilized by the coating solvent. However, when water borne coatings are applied to such substrates, these staining agents can leach from the substrate into the coating causing it to discolour.

Wood substrates, in particular, contain a number of water-soluble, chromophoric staining agents: of these, tannins and lignin can readily leach from the substrate into an aqueous coating, causing staining which appears as discolouration on the surface of the coating. Such leaching can occur upon application or during the service life of the coating. Moreover, other staining agents that can leach from wood are terpenoid based resins and alkaloids such as chlorophorin.

A staining of the substrate and of coatings applied to the substrate can also be caused by external sources. For example, cigarette smoke causes nicotine staining, which discolours light coloured coatings, and ink from pens can cause marker stains on the substrate. When such stained substrates are (re-)coated, an undesired discolouration of the top coat may occur.

Each of the above-mentioned effects of staining is highly undesirable in coatings and the patent literature consequently documents many attempts to improve the stain blocking, and particularly tannin-blocking properties of water borne coatings.

Historically, reactive pigments such as zinc oxide, aluminium zirconium phosphosilicate or barium phosphosilicate were found to be quite effective in blocking stains caused by inter alia tannins. However, these reactive pigments could obviously only be used in the sub-set of pigmented aqueous coatings and not in clear coatings. Moreover, these reactive pigments could cause de-stabilizing polymer gelation and coagulation in coatings containing them. As a consequence, it has become desirable to develop stain-blocking aqueous coating compositions which did not contain reactive pigments.

WO2005071023 (Nuplex Resins B.V.) discloses a stain blocking water borne coating composition, suitable for use in clear coats, which comprises an organic binder and, as the stain blocking agent, at least one type of inorganic nanoparticles having a layered structure and a crystal structure with positively charged layers. In their natural or as-synthesized state these inorganic particles exist as aggregates consisting of a large number of primary particles. To provide haze free coatings, the inorganic particulates cannot be so aggregated and therefore, in the production of the coatings, the aggregates must be first broken down to the level of their primary particles or even further. This is achieved by combining a slurry of the particles with a suitable anionic dispersing agent but such a method step is time and energy consuming and reduces the formulation space of the coating composition. Furthermore, in practice, coatings containing these inorganic particulates have been found to be ineffective at blocking extractions from knots in wooden substrates.

In place of adding inorganic particulates to the aqueous coating composition, certain authors have proposed incorporating strong acids or cationic functionality into the backbone of the coating's binder to reduce or eliminate stain bleeding.

US Patent Application 2003/0073778 (Rohm & Haas) describes an aqueous stain-blocking coating composition which comprises from 0.1% to 10% by weight of at least one monomer bearing a pendant acid group having a pKa (in water at 20° C.) of less than 4, and salts thereof. The incorporation of such acid groups into the binder does however lead to an increased hydrophilicity of the coating which results in decreased water barrier properties.

U.S. Pat. No. 5,312,863 (Rohm & Haas) describes a stain-blocking coating composition containing an aqueous dispersion of a cationic latex polymer binder having an incorporated cationic functionality provided by an acid-protonated amine functional latex or a quaternary ammonium functionality. The principal drawback of this composition is the limited availability of coating ingredients that are cationic.

The present invention seeks to provide a stain-blocking aqueous coating composition which does not suffer from the disadvantages documented in the prior art.

Statement of the Invention

In accordance with the present invention there is provided a stain-blocking, water borne coating composition which is optionally either transparent or semi-opaque and which comprises: (a) a styrene acrylic resin; and, (b) a substituted styrene acrylate copolymer, wherein, by weight, said styrene acrylic resin is provided in excess of said substituted styrene acrylate copolymer. The present invention is thus directed to a specific blend of two resinous components which, without being bound by theory, contribute synergistically to the stain-blocking capability of the overall aqueous composition.

As recited, the styrene acrylic resin (a) should be provided in excess of the substituted styrene acrylic resin (b). For instance, the aqueous composition has been found to be particularly effective when the ratio by weight of the styrene acrylic resin to the substituted styrene acrylate copolymer is in the range of from 80:20 to 55:45, especially from 75:25 to 60:40, and more especially from 70:30 to 60:40. In one particularly preferred embodiment, the ratio by weight of the styrene acrylic resin to the substituted styrene acrylate copolymer is approximately 2:1.

The exact forms of the styrene acrylic resin a) and the substituted styrene acrylate co-polymer are not intended to be limited. However, in an effective embodiment of the invention, the styrene acrylic resin a) is characterised by a glass transition temperature ($T_g$) in the range from 5° C. to 95° C. In addition, or independently, the substituted styrene acrylate copolymer should preferably be characterised by a glass transition temperature ($T_g$) in the range from 10° C. to 50° C.

A second aspect of the present invention concerns a method for coating a substrate comprising water extractable staining agents wherein said substrate is coated with water borne coating composition comprising: a) a styrene acrylic resin; and b) a substituted styrene acrylate copolymer. In general the water borne composition will be applied as either one or more primer layers or as one or more mid-coat layers.

Suitable substrates are wooden and preferred substrates are tannin-containing open grain natural wood. For such woods, it is preferred that the coating composition has a total solids content of from 30 to 80 wt % or from 25 to 75 vol % in order to ensure that adequate filling of the pores in the wood surface. Using such high solids coating compositions, excellent stain-blocking results have been obtained for substrates which comprise one or more woods selected from the group consisting of oak, merbau, larch and Sapupira. The total solids content of the coating composition can be controlled by the amount of the high and low solids polymers used in the overall coating composition.

The present invention is further directed to the coated substrate which is obtainable by the above recited method.

Definitions

As used herein terms including "meth" in parentheses, such as "(meth)acrylate," are intended to refer either to the acrylate or to the methacrylate, or mixtures of both. Similarly, the term (meth)acrylamide would refer either to the acrylamide or to the methacrylamide, or mixtures of both, as one skilled in the art would readily understand.

As used herein, the term "volatile organic compound" (VOC) is defined as a carbon-containing compound that has a boiling point below 250° C. at atmospheric pressure.

Measurement of the VOC emissions of the coating or coating materials of the present invention should be conducted in accordance with ISO 11890-2: 2006. The measurement conditions of this ISO norm should be directed to quantitatively measure the full content of VOC. The VOC should be expressed in weight % of the total formulation i.e. water is included in the total formulation and in the VOC calculation as well.

Measurement of the solids content of coating or coating materials is conducted in accordance with EPA Test Method 24 (40 CFR 60, Appendix A).

According to a preferred embodiment of the invention, the calculated glass transition temperature ($T_g$) is from 5° C. to 95° C. for the styrene acrylic resin (a), and from 10° C. to 50° C. for the substituted styrene acrylate copolymer (b). Calculated Tg values as used herein are those calculated using the Fox equation (T. G. Fox, Bull. Am. Physics Soc. Volume 1, Issue No. 3, page 123 (1956)), whereby for calculating the Tg of a copolymer of monomers (1) and (2):

$$1/Tg \text{ (calc.)} = w(1)/Tg(1) + w(2)/Tg(2),$$

Wherein: Tg(calc.) is the glass transition temperature calculated for the copolymer; w(1) is the weight fraction of monomer (1) in the copolymer; w(2) is the weight fraction of monomer (2) in the copolymer; Tg(1) is the glass transition temperature of the homopolymer of monomer (1); Tg(2) is the glass transition temperature of the homopolymer of monomer (2). The glass transition temperatures of homopolymers may be found, for example, in "Emulsion Polymerization and Emulsion Polymers", edited by P. A. Lovell and M. S. El-Aasser, John Wiley and Sons, 1997.

Minimum Film Forming Temperature (MFFT), also called Minimum Filming Temperature (MFT), is the minimum temperature at which the latex forms a continuous film, as evidenced by a visual lack of cracking or powdery appearance of the film. As used herein, MFFT (MFT) was measured according to ISO Test Method ISO 2115. According to that method, a polymer dispersion is dried at a suitable temperature gradient with a current of moisture-free air, and the temperature at which the coalesced (transparent) section of the film meets the uncoalesced (white) section is determined in (° C.).

DETAILED DESCRIPTION OF THE INVENTION

The two aforementioned resins [(a), (b)], each provided as a dispersion in a water base medium, are combined under mixing to form the coating composition according to the present invention.

These dispersions may be provided from known commercial sources. For example, suitable first binders (a) are Setaqua 6776 (available from Nuplex Resins B.V.) and Joncryl® 8284 (available from BASF Performance Chemicals), and a suitable second binder (b) is Hydropliolite 055 (available from Eliokem Inc., Ohio). Alternatively, it is envisaged that each of these aqueous dispersions of binders may be provided by independently polymerizing appropriate monomer mixtures as will be described hereinbelow.

The independent polymerizations should both be conducted in a water medium, under stirring/mixing. As is known in the art, the volume of the water base medium may be set in such a way that the (substituted-) styrene-acrylic emulsion to be obtained offers desired physical properties. As the resultant emulsions should be VOC compliant, it is preferred to minimise the amount of hydrophilic co-solvents such as a lower alcohols present in the water-base medium.

Preferably the independent polymerizations are free radical emulsion polymerizations as known in the art. Preferred free radical generating means are chemical initiators, especially the peroxygen compounds such as potassium persulfate, ammonium persulfate, hydrogen peroxide and the entire class of organic peroxides and hydroperoxides such as cumene hydroperoxide and t-butyl hydroperoxide. Further suitable initiators are preferably graft-linking, water-soluble redox systems which comprise by way of example: hydrogen peroxide and a heavy metal salt; hydrogen peroxide and sulfur dioxide; or, hydrogen peroxide and sodium metabisulfite. The initiators are used, for example, in an amount of from 0.05 to 5% by weight, preferably from 0.1 to 4% by weight, based on the monomers.

The independent polymerizations should usually be carried out in the absence of oxygen—that is in an inert gas atmosphere—and at a temperature of from 20° to 110° C., or more usually from 30° C. to 90° C. If appropriate, conventional ionic, nonionic or amphoteric emulsifiers can be added to the polymerization batch, said emulsifiers being described in, for example, M. Ash & I. Ash, *Handbook of Industrial Surfactants*, $3^{rd}$ Edition, Synapse Information Resources Inc.

During an emulsion polymerization, either the monomers can be metered directly into the initially taken mixture or they can be added in the form of an aqueous emulsion or miniemulsion to the polymerization batch. For this purpose, the monomers are emulsified in water using the abovementioned conventional emulsifiers.

If appropriate, conventional regulators which reduce the molecular weight of the polymers forming can be used. Said regulators are preferably organic compounds which comprise sulfur in bound form, for example mercaptans, di- and polysulfides, esters and sulfides of thio- and dithiocarboxylic acids and enol sulfides. Halogen compounds, aldehydes, ketones, formic acid, enol ethers, enamines, hydroxylamine, halogenated hydrocarbons, alcohols, ethylbenzene and xylene are also suitable as regulators.

Provision of the First Resin

The resin (a) is a styrene acrylic resin obtainable as the polymerization product of a monomer mixture comprising: styrene in an amount of up to 40 wt. %, preferably of from 10 to 40 wt. % and more preferably of from 20 to 30 wt. %, based on total monomers; and, one or more acrylic monomers such as (meth)acrylic acid, (meth)acrylic monomers containing a hydroxyl group, (meth)acrylic acid esters and (meth)acrylonitrile. Examples of the (meth)acrylic monomers containing a hydroxyl group include 2-hydroxyethyl (meth)acrylate, 3-hydroxypropyl (meth)acrylate, 4-hydroxybutyl (meth)acrylate, and ε-caprolactone adducts thereof. Examples of the acrylic monomer containing an ester group include methyl (meth)acrylate, ethyl (meth)acrylate, butyl (meth)acrylate, isobutyl (meth)acrylate, n-pentyl (meth)acrylate, neopentyl (meth)acrylate, cyclohexyl (meth)acrylate, 2-hexyl (meth) acrylate, 2-ethylhexyl (meth)acrylate, and isobornyl (meth) acrylate.

Preferably the acrylic monomers to be polymerized with styrene are selected from the group consisting of methyl (meth)acrylate, ethyl (meth)acrylate, butyl (meth)acrylate, isobutyl (meth)acrylate, 2-ethylhexyl (meth)acrylate and mixtures thereof.

In an embodiment of the invention, the styrene acrylic resin (a) is the polymerization product of a monomer mixture comprising styrene, methyl methacrylate and 2-ethyl hexylacrylate. Preferably, that monomer mixture comprises from 10 to 40 wt. % (based on total monomers) of styrene, from 10 to 40 wt. % methyl methacrylate and from 30 to 60 wt. % 2-ethylhexyl acrylate. More preferably the monomer mixture comprises from 20 to 30 wt. % (based on total monomers) of styrene, from 20 to 30 wt. % methyl methacrylate and from 45 to 55 wt. % 2-ethylhexyl acrylate.

The styrene acrylic resin (a) should have a weight average molecular weight of from 500,000 to 1,000,000 and should have a glass transition temperature of not lower than 5° C. and not more than 95° C.

Provision of the Second Resin

The second resinous component (b) of the coating composition is a substituted styrene acrylate copolymer. This copolymer is provided as the polymerization product of a monomer mixture comprising: one or more substituted sytrenes in an amount up to 40 wt. % by total weight of monomers; and, one or more esters of (meth)acrylic acid. Preferably, both alkyl methacrylate monomers and alkyl acrylate monomers should be present in the monomer mixture.

Substituted styrenes are to be understood as meaning styrenes having the general formula (I) below:

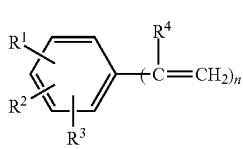

(I)

in which: $R^1$ to $R^3$ are identical or different and represent hydrogen, halogen, lower alkyl or lower alkoxy, each of which is optionally substituted by halogen; $R^4$ denotes hydrogen or lower alkyl; and. n represents 1 or 2.

Suitable lower alkyl radicals are those having from 1 to 5, preferably from 1 to 4, carbon atoms, such as the methyl, ethyl, n-propyl, iso-propyl, n-butyl, iso-butyl, sec-butyl and tert-butyl radical, particularly preferably the methyl, ethyl and iso-propyl radical;. Suitable lower alkoxy radicals are those having from 1 to 5, preferably from 1 to 3, carbon atoms, such as the methoxy, ethoxy, propoxy and isopropoxy radical. Examples of halogen-substituted alkyl or alkoxy groups which may be mentioned are: the trifluoromethyl and trifluoromethoxy group.

Exemplary substituted styrenes are: 2-chlorostyrene, 3-chlorostyrene, 4-chlorostyrene, 3,4-dichlorostyrene, 2,4-dichlorostyrene, α-methyl-3-chlorostyrene, α-ethyl-3-chlorostyrene, α-isopropyl-3-chlorostyrene, α-butyl-3-chlorostyrene, α-methyl-4-chlorostyrene, α-ethyl-4-chlorostyrene, α-isopropyl-4-chlorostyrene, α-butyl-4-chlorostyrene, α-methyl-3,4-dichlorostyrene, α-ethyl-3,4-dichlorostyrene, α-isopropyl-3,4-dichlorostyrene, α-butyl-3,4-dichlorostyrene, 2,6-dichlorostyrene, 2-bromostyrene, 2,4-dibromostyrene, 3-bromostyrene, 4-bromostyrene, 2-fluorostyrene, 3-fluorostyrene, 4-fluorostyrene, α-methyl-4-fluorostyrene, α-methyl-4-fluorostyrene, α-isopropyl-4-fluorostyrene, α-n-butyl-4-fluorostyrene, 2-methylstyrene, 3-methylstyrene, 4-methylstyrene, 2-methoxystyrene, 4-methoxystyrene, 2-trifluoromethylstyrene, 3-trifluoromethylstyrene, 4-trifluoromethoxystyrene, 4-propylstyrene, 4-cyclohexylstyrene, 4-dodecylstyrene, 2-ethyl-4-benzylstyrene, para-tertiary-butylstyrene, 4-(phenylbutyl) styrene p-divinylbenzene, m-divinylbenzene, and o-divinylbenzene.

Of these exemplary substituted styrenes, preferred for use in the present invention are: 2-methylstyrene, 3-methylstyrene, 4-methylstyrene, para-methyl-styrene, ortho-methylstyrene, para-tertiary-butylstyrene and mixtures thereof.

Suitable esters of acrylic acid and of methacrylic acid are those derived from monohydric C2- to C12-alcohols, such as ethyl (meth)acrylate, n-propyl (meth)acrylate, isopropyl (meth)acrylate, n-butyl (meth)acrylate, isobutyl (meth)acrylate, tert-butyl (meth)acrylate, sec-butyl (meth)acrylate, n-pentyl (meth)acrylate, neopentyl (meth)acrylate, cyclohexyl (meth)acrylate, 2-hexyl (meth)acrylate, 2-ethylhexyl (meth)acrylate, n-octyl (meth)acrylate, isooctyl (meth)acrylate, decyl (meth)acrylate, and dodecyl (meth)acrylate. Another suitable acrylate is methyl acrylate.

The preferred monomers of this group are ethyl (meth) acrylate, propyl (meth)acrylate, n-butyl (meth)acrylate, isobutyl (meth)acrylate, tertiary-butyl cyclohexyl methacrylate and 2-ethylhexyl acrylate. In an embodiment of the invention, the monomer mixture comprises a mixture of 2-ethyl hexylacrylate, tertiary-butyl-cyclohexyl methacrylate and isobutyl methacrylate.

The substituted styrene acrylate copolymer (b) should have a weight average molecular weight ($M_w$) of from 10,000 to 500,000 and more usually of from 50,000 to 300,000 and should have a glass transition temperature ($T_g$) of not lower than 10° C. and not more than 50° C., and more usually of from 15° C. to 40° C.

Further Components of the Coating Composition

The coating composition of the present invention may optionally comprise up to 15 wt. % of additives. Without limitation, suitable additives include: surfactants; anti-oxidants; fillers; extenders; pigments; optical brighteners; light stabilizers; and, co-solvents. Any such additives present should be dispersed, preferably homogenously, throughout the coating composition. To achieve this, the additives may be added in solid form or in pre-dispersed form to the blend of the two resins under stirring: Alternatively, the additives may be provided within one or both of the aqueous dispersions of the first and second resins, these dispersions being then blended to form the overall coating composition.

Surfactants (surface-active agents) form an important group of additives which may be present in the coating composition to provide smooth, uniform coatings. Suitable surfactants include, but are not limited to, flow control agents, wetting agents, dispersants, adhesion enhancers and defoamers. The preferred surfactants are either non-ionic or anionic.

Flow control agents are organic compounds capable of helping the coating wet the substrate and flow over possible contaminations. Exemplary flow control agents are sold under the trade names BYK 344 (BYK Chemie, Wallingford, Conn.), Air Products HS-30, and Witco L-7500.

Organic dispersants are hydrocarbon modified surface acting agents with acid or basic functionality designed to aid in the separation of agglomerates. Exemplary dispersants include Anti terra (BYK Chemie).

Organic defoamers are another class of surfactants that may be included in the coating compositions of the present invention. Organic defoamers are hydrocarbon modified liquids, sometimes with silicone modification. The defoamer serves to break bubbles and air entrapment in the system. An exemplary defoamer is sold under the trade name BYK-077 (BYK Chemie).

Further exemplary surfactants which may be present in the coating composition are available under the trade designation Silwet L-7210 (Osi Specialties Inc., Danbury, Conn.), BYK 346 (BYK Chemie, Wallingford, Conn.), Surfynol 104PA (Air Products and Chemicals, Inc., Allentown, Pa.) and Triton GR-7M (Union Carbide Chemicals and Plastics Co., Inc., Danbury, Conn.).

Typically the surfactant, or mixture of surfactants, should be included in the compositions of the present invention in an amount of from 0.1 to 5 wt % and more preferably, from 0.5 to 3 wt %, based on the total weight of the coating composition (including water and any co-solvent present).

The coating composition of the present invention may optionally comprise up to 5 wt. % (based on the total weight of the composition) of a co-solvent. This co-solvent should operate with the system binders to diminish raising of the natural grain of the wood substrate to which the composition is applied. In the absence of co-solvents, the water content of the composition promotes this unsightly raising of the grain and can also result in a dry time that is too fast for practical consumer application. Suitable co-solvents include texanol, ethyl diglycol and methoxypropoxypropanol (Solvenon DPM).

In a preferred embodiment of the present invention the aqueous coating composition is free of conventional metal-based, stain blocking agents.

Although it is envisaged that the coating compositions of the present invention could be formulated to be opaque, it is preferred that the compositions be transparent or semi-opaque. As such, the disclosed coating compositions of the present invention preferably do not contain appreciable amounts of opacifying pigments such as $TiO_2$, since the presence of such pigments could make the coating sufficiently non-transmissive to visible light so that the coating is not transparent and the underlying wood grain may not be discerned through the coating.

Pigments for use with semi-transparent or semi-opaque compositions of the present invention are known in the art. Exemplary pigments include titanium dioxide white, carbon black, lampblack, black iron oxide, red iron oxide, transparent red oxide, yellow iron oxide, transparent yellow oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, or organic yellows (such as monoazo yellow) and mixtures thereof. Particularly suitable pigments for inclusion in the coating composition are transparent iron oxide. Five colors of transparent iron oxide (yellow S102, red S202, black S301, brown S401 and green S501) are commercially available from Suncom, China.

The solids content of the aqueous coating composition may be from about 25% to about 75% by volume. The viscosity of the aqueous coating composition may be from 0.05 to 10 Pa·s (50 cps to 10,000 cps), as measured using a Brookfield viscometer at 25° C. As would be recognized by a skilled practitioner, the viscosities which are appropriate for different application methods vary considerably.

The wooden substrate to be coated may be of any form known in the art, including for example unedged timber, flitches, boules, half-edged boards, square-edged lumber, strips, squares, carcassing, truss beams, scantlings and tongue-and-groove flooring, such as parquet, decking (E2E or E4E), and anti-slip decking (1 or 2 sides). The coatings of the present invention may be applied to fully cover said substrates or to cover only parts thereof, including edges, curvilinear surfaces, routered and beveled areas.

The particular wood surface to be coated may be cleaned and prepared for application of the disclosed coating compositions using methods, such as sanding, that will be familiar to those skilled in the art. The coating composition is then best applied as either the primer or midcoat (or first finish coat) of a coating system. In any event, the coating system is preferably applied as a plurality of layers, with light sanding and/or denibbing optionally being performed after the cure of each layer and prior to application of further layers. Each layer preferably is applied in an amount sufficient to provide good wet coat coverage and a continuous cured coating.

The aqueous coating composition may applied by conventional application methods such as flooding, dipping, brushing, roll coating, doctor-blade application, printing methods, air-atomized spray, air-assisted spray, airless spray, high volume low pressure spray, air-assisted airless spray and high-speed rotation bell.

It is recommended that the coating compositions be applied to a wet film thickness of from 0.02 to 0.1 mm (1 to 4 mils). The application of thinner layers within this range is more economical and provides for a reduced likelihood of thick cured regions that may require extra sanding. However, great control must be exercised in applying thinner coatings so as to avoid the formation of a discontinuous cured film.

The applied coating layers should be exposed to sufficient curing conditions to obtain a thorough cure. Suitable curing conditions may be determined empirically based on the particular application equipment, the wood species employed and the ambient temperature.

The aqueous coating compositions of this invention may provide smooth and even coatings for close grain natural woods which have somewhat uniform pore sizes such as alder, aspen, basswood, beech, birch, cedar, cherry, fir, hemlock, maple, pine and spruce. However, the coatings of the present invention are preferably used to coat more open grain natural wood substrates, such as oak, mahogany, ash, hickory, teak and walnut. In particular, the wooden substrate may be derived from trees of the following geni: *Intsia; Larix; Quercus; Bowdichia; Diplotropis;* and, *Ferreirea*. For instance, the coating is particularly suitable for application to known merbau, larch, oak or Sapupira wooden substrates.

EXAMPLE

A styrene acrylic resin is provided in pre-dispersed form as Setaqua 6776 (available from Nuplex Resins B.V.). This is an aqueous dispersion (44 wt. % solids) of which the constituent resin has a MFFT of 5° C.

A substituted styrene acrylate copolymer is provided in pre-dispersed form as Hydropliolite 0055 (available from Eliokem Inc.). This is an emulsified, aqueous dispersion (40 wt. % solids; 300nm average polymeric particle size) of which the constituent copolymer resin has a $T_g$ of 25° C.

The two aqueous dispersions above are combined under mixing using a regular high speed stirrer. A first set of different aliquots are prepared in which the ratio by weight of the styrene acrylic resin (a) to the substituted styrene acrylate copolymer (b) in the blend was as defined in Table 1 below. These are aliquots in which the styrene acrylic resin (a) was provided in excess of the substituted acrylate copolymer (b).

A dispersion in water of additives (de-foamer, in-can preservative and wetting agent) is further mixed into the blend of resinous components such that the additives comprise 0.6 wt. % (by total weight of the aqueous coating compositions) for each of the tabulated aliquots.

Each aliquot was applied as a primer in two or three layers by dipping onto individual square test panels of Oak. The first primer layer was applied with a yield between 8 and 10 m²/litre, the second primer layer was applied with a yield between 10 and 20 m²/litre). The drying time in between application of the first and second layer was approximately 3 hours. After the application of the primer layers, no bleeding of tannins could be observed.

The primer was subsequently over-coated with a waterborne clear- or pigmented topcoat. The topcoat layer was applied after 16-24 hrs of drying and with a yield between 9 and 13 m²/litre. Substrates were dried for one week at 23° C. and afterwards exposed in the humidity cabinet for 10 cycles where 1 cycle constitutes 24 hours at 60° C. and relative humidity of 100% and 24 hours at 23° C. The tannin bleeding was observed visually and rated from 0 (no bleeding) to 5 (severe bleeding).

TABLE 1

| Ratio By Weight (a):(b) | Tannin Bleeding |
|---|---|
| 80:20 | 3-4 |
| 70:30 | 0-1 |
| 60:40 | 0-1 |

In the same manner as described above, a further set of aliquots was prepared in which the amount of substituted acrylate copolymer (b) was provided either in an identical amount to or in excess of the styrene acrylic resin (a). However, these aliquots were unstable, showing irreversible thickening.

The invention claimed is:

1. A stain blocking water borne coating composition comprising
   (a) a styrene acrylic resin having a glass transition temperature ($T_g$) in the range from 5° C. to 95° C.; and,
   (b) a substituted styrene acrylate copolymer having a glass transition temperature ($T_g$) in the range from 10° C. to 50° C.,
   wherein, by weight, said styrene acrylic resin is provided in excess of said substituted styrene acrylate copolymer such that the ratio by weight of the styrene acrylic resin to the substituted styrene acrylate copolymer is in the range from 80:20 to 55:45.

2. The stain blocking composition according to claim 1, wherein the ratio by weight of the styrene acrylic resin to the substituted styrene acrylate copolymer is in the range from 75:25 to 60:40.

3. The stain blocking composition according to claim 2, wherein said ratio by weight is in the range from 70:30 to 60:40.

4. The stain blocking composition according to claim 1, wherein said substituted styrene acrylate copolymer has a glass transition temperature ($T_g$) in the range from 15° C. to 40° C.

5. The stain blocking composition according to claim 1, having a total solids content of from 30 to 80 wt. % or from 25 to 75 vol. %.

6. The stain blocking composition according to claim 1 being translucent or semi-opaque.

7. A method for coating a substrate comprising water extractable staining agents wherein said substrate is coated with a water borne stain blocking coating composition of claim 1.

8. The method according to claim 7, wherein said water borne coating composition is applied as one or more primer layers.

9. The method according to claim 7, wherein said water borne coating composition is applied as one or more midcoat layers.

10. A coated substrate comprising water extractable staining agents obtained by the method of claim 7.

11. The coated substrate according to claim 10, wherein the substrate is wooden.

12. The coated substrate according to claim 11, wherein the substrate comprises a tannin-containing open grain natural wood.

13. The coated substrate according to claim 11, wherein the substrate comprises one or more woods selected from the group consisting of oak, merbau, larch and Sapupira.

* * * * *